3,213,162
METHOD OF MAKING NUCLEAR FUEL COMPACT
Dale E. Johnson, Cardiff, and Fred H. Lofftus, Del Mar, Calif., assignors to the United States of America as represented by the United States Atomic Energy Commission
No Drawing. Original application Sept. 30, 1960, Ser. No. 59,485, now Patent No. 3,161,701, dated Dec. 15, 1964. Divided and this application Nov. 6, 1964, Ser. No. 418,576
10 Claims. (Cl. 264—.5)

This is a division of application S.N. 59,485 filed September 30, 1960, now Patent No. 3,161,701 granted Dec. 15, 1964.

The present invention generally relates to improved fuel bodies, and more particularly relates to improved ceramic fuel bodies for neutronic reactors and methods of fabricating the same.

In neutronic reactors, it is important to provide fuel bodies which have high structural stability, density, thermal conductivity and resistance to migration of fission products therefrom. It is also particularly desirable to provide fuel bodies which have uniform fuel distribution therein, so that so-called "hot spots" or localized zones of higher temperature are avoided in the fuel bodies during operation of the reactor. Thus, both uniform heat production characteristics and uniform heat transfer characteristics are desired.

Difficulties in providing these fuel body characteristics are considerably increased in high temperature reactors since, under such circumstances, fission product migration is ordinarily substantially increased, fuel bodies are subjected to increased stresses and strains, etc.

Accordingly, it is the principal object of the present invention to provide improved fuel bodies for neutronic reactors. It is also an object of the present invention to provide improved high temperature fuel bodies for neutronic reactors and methods of fabricating the same. It is a further object of the present invention to provide methods of fabricating fuel bodies which have a high structural strength, and increased thermal conductivity, density and resistance to migration of fission products therefrom, particularly at relatively high operating temperatures and also uniform heat production and heat transfer characteristics. Other objects and advantages of the present invention are as set forth in the following detailed description.

Basically, the improved high temperature fuel bodies of the present invention are ceramic in form, combining ceramic nuclear fuel with a protective refractory material. Moreover, they are dense. They have an increased ability to resist stresses and strains normally encountered at high temperatures and are capable of operating efficiently over a wide temperature range with reduced fission product migration therefrom. Moreover, the ceramic fuel particle size can be selected such that the ability of the fuel material to retain fission products can be further enhanced. In addition, because of the use of ceramic materials for both the fuel and the protective material and because the fuel particles can be uniformly distributed within the fuel body, uniform heat production and heat transfer from the fuel body can be obtained during reactor operation.

More specifically, ceramic nuclear fuel, that is, nuclear fuel in the ceramic form, either as an oxide, carbide, silicide or similar form, is combined with a suitable protective refractory material. Generally speaking, nuclear fuel carbides are most effectively protected by refractory carbides, nuclear fuel silicides with protective refractory silicides, etc. Accordingly, in the case of nuclear fuel oxide, the protective refractory material preferably comprises one or more refractory metal oxides exhibiting suitable neutron absorption cross-section characteristics, to form a fuel body, and the fuel body is sintered to form the desired product.

The combining of the ceramic fuel with the protective ceramic material can be carried out by either dispersing the fuel in a matrix of the protective ceramic substance or by coating the fuel with a film or sheath of the protective ceramic material. In accordance with a first embodiment of the invention, ceramic nuclear fuel, comprising one or more oxides, carbides, silicides, etc. of nuclear fuel, that is, of uranium, thorium, or plutonium, is dispersed in discrete particle form of desired size within a matrix of a suitable protective ceramic material, such as the corresponding oxide, carbide, silicide, etc. In the case of nuclear fuel oxides, the protective refractory material is a suitable ceramic metal oxide. Preferably, the oxide is selected from the group consisting of alumina, that is, aluminum oxide, $Al_2O_3$, beryllia, that is beryllium oxide, BeO, or a mixture thereof. Most preferably, beryllia is employed. The particles of the ceramic fuel are uniformly distributed within the matrix to form a fuel body. A method of distribution is carried out which maintains the integrity of the individual particles of the ceramic fuel. Accordingly, the described advantages of controlled fuel particle size and distribution are retained. After such distribution, the fuel body is sintered to the desired finished ceramic fuel body. The sintering temperature is a function of the characteristics of the particulate materials. It may be as high as 1750° C. or as low as 1400° C., depending upon the size and type of particles to be sintered, etc.

In carrying out the method of the present invention in accordance with the described first embodiment, the ceramic nuclear fuel is desirably in discrete particulate form of controlled size, preferably larger than approximately 150 microns. Production of the fuel in particulate form can be accomplished in any suitable manner. However, a particularly advantageous way of providing fuel particles of desired size comprises moistening a quantity of powdered ceramic fuel with a solution comprising a suitable selected binder for the fuel and a solvent for the binder and mixing it into a mass. The moistened mass of ceramic fuel powder is then dried, as in a vacuum drying oven, at a low temperature, for example, about 100° F., after which the dried cake is crumbled and then compacted at a high pressure, for example, from about 10,000 to about 20,000 p.s.i., in suitable apparatus, for example, a die. The resulting compact is then converted to desired particle size. This can be accomplished by crushing and separating the crushed particles according to size by passing through suitable sieves or the like.

The fuel particles of controlled size so formed are then introduced into the matrix of protective refractory material in a manner which assures uniform distribution therein while the fuel body comprising the same is formed. In this regard, the particulate ceramic nuclear fuel can be uniformly distributed within a wet paste comprising powdered refractory material, binder for the refractory material, and a solvent for the binder, by mixing or the like. Subsequently, the paste containing the nuclear fuel therein as by mixing or the like, is dried and compressed at a suitable pressure, for example, 10,000 to 30,000 p.s.i. to form a dense fuel body. The fuel body is then sintered at high temperature to provide the desired dense, thermally conductive, high temperature ceramic fuel body resistant to fission product migration, having uniform heat production and heat transfer characteristics and having the fuel retained therein in discrete particulate form.

In selecting suitable binder-solvent combinations for carrying out the process, it is important to so select that the fuel binder is insoluble in the solvent for the protective refractory material binder. Otherwise, the fuel particles will break down to the unbound powdered form, and the desired maintenance of discrete fuel particles will no be obtained. It is of distinct advantage to have the fuel retained in discrete particulate form, i.e., for improved fission product retention, etc.

Thus, for example, polyvinyl alcohol can be used as the binder for the uranium dioxide ceramic fuel. In such instance, the solvent for the protective refractory material beryllia binder should not be capable of dissolving the polyvinyl alcohol. Polyvinyl alcohol is soluble in water which may be used as the solvent therefor in the process, but is insoluble in carbon tetrachloride. If water were used to dissolve or thin the binder for the refractory material, in the event a binder such as protein adhesive, etc. were used, the water would also dissolve the polyvinyl alcohol holding the fuel powder together as discrete particles, and the fuel particles would thus break down. Loss of desired spacing and grouping of the fuel in the protective refractory material would result. Carbon tetrachloride can, on the other hand, be used as the solvent for the protective refractory material binder without affecting the polyvinyl alcohol. The refractory material binder, for example, may be paraffin, microcrystalline wax or the like substance soluble in the carbon tetrachloride and effective as a binder for the beryllia.

Alternatively, the paraffin-carbon tetrachloride could be used as the binder-solvent for the fuel, and the polyvinyl alcohol-water could be used as the binder-solvent for the protective refractory material inasmuch as water does not dissolve paraffin. However, if the water were heated to above the melting point of the paraffin, undesired break down of the fuel particles would also occur. Thus, the temperature during the process should be kept low enough, however, to prevent the paraffin from melting, i.e., should be maintained at not over 140° F. until the paste is dried and the fuel body is to be formed.

Other suitable binder-solvent combinations can be effectively utilized. Selection thereof in accordance with the principles set forth herein is within the skill of the art. Thus, for example, trichlorethylene-vinyl plastic or resin combinations can be used with protein-water combinations, etc. In this regard, uranium dioxide powder can be moistened with casein-water solution, dried and formed into particles in the described manner. Alumina in powder form may be moistened with a solution of polyvinyl acetate and orthodichlorobenzene to form a thick paste. Into the wet paste are then mixed the fuel particles in a manner such that the particles are uniformly dispersed.

It will be noted that the fuel particles are readily uniformly distributed within the wet paste during processing and that their relative spacing therein and particulate nature are readily maintained while the paste is dried and pressed, and the resultant fuel body is sintered.

Various features of the described embodiment are set forth in the following example:

Example I

Uranium dioxide in powdered form is mixed with a solution comprising polyvinyl alcohol and water, the solution being added in an amount sufficient to bind the powder into a wet paste-like mass. The mass is then dried at 130° F. in a vacuum drying oven. The dried cake is crumbled, and the resulting particles are introduced into a hardened steel die and compacted at about 15,000 p.s.i. The resulting compact is then crushed and the crushed compacted particles are passed through a 60 mesh screen.

Beryllia in powder form is mixed with paraffin dissolved in carbon tetrachloride to form a thick wet paste. The particles of compacted uranium dioxide are then introduced into the wet paste by mixing therewith, the fuel particles being uniformly distributed and suspended in the paste. The resulting mixture is forced through a 60 mesh screen to assure uniform distribution of particles and removal of particles of undesired size and lumps, and is then dried in a vacuum oven at 100° F., i.e., at low temperature below the melting point of the paraffin. The dried paste is then crumbled and placed in a hardened steel die wherein it is pressed at about 30,000 p.s.i. to form a fuel body. The fuel body is removed from the die and sintered in a hydrogen atmosphere, then cooled to ambient temperature to a finished fuel body characterized in that the uranium dioxide is still present in particulate form uniformly distributed throughout the beryllia matrix. The fuel body, thus, is essentially ceramic, highly thermally conductive with uniform heat production and heat transfer characteristics, dense and resistant to fission product migration, and is suitable for use over a wide temperature range, without cracking or deteriorating. In this connection, the fuel body when employed in a reactor core provides substantially less migration of fission products therefrom than an identical fuel body which, however, does not contain the fuel in discrete particle form of the described size, but instead has the fuel distributed throughout the matrix as a very fine powder. Such latter fuel body can result from employing in the present process a solvent for the refractory material binder which solvent also dissolves the fuel binder.

In accordance with a second embodiment of the method of the present invention, the ceramic fuel body can be formed by coating ceramic nuclear fuel with the protective refractory material and forming into a fuel body. Thereafter, the fuel body is sintered, as previously described, to provide the desired, finished, high temperature ceramic fuel body.

The coating operation may be carried out on nuclear fuel particles of a desired size, preferably above 150 microns average size, and comprising the nuclear fuel itself or aggregates of small particles of the nuclear fuel formed and bound together, as previously described in connection with the first embodiment of the present invention.

Alternatively, the coating operation can be carried out on a compact of the fuel particles, that is, the fuel particles can first be assembled into a fuel compact and then the surfaces of the fuel compact can be sheathed or coated with the desired protective refractory material to wholly enclose the compact. Thereupon the resultant fuel body can be sintered, as previously indicated, to form the desired product.

In accordance with the first indicated version of the described second embodiment, ceramic nuclear fuel particles of the type previously described in connection with the first embodiment, and present as small fuel particles or as aggregates of small particles, or as compacted powders, i.e., pills or pellets of various sizes, are coated with the previously described protective refractory material, that is, refractory metal oxide preferably selected from the group consisting of alumina, beryllia and mixtures thereof.

The coating operation can be effected in any suitable manner. Preferably, the ceramic nuclear fuel particles are sprayed with or immersed in a slurry comprising the metal oxide in powder form dispersed in a suitable inert medium, for example, carbon tetrachloride. The fuel particles may be contacted only once with the slurry, or may be repeatedly contacted with the slurry, with drying steps in between contactings, so as to build up a coating upon the surface of and wholly enclosing each particle against fission product migration therefrom.

The coating operation is carried out at low temperatures below the melting point of the binder for the coating. For example, uranium dioxide particles of 20 mesh size can be sprayed at 100° F. with a slurry comprising 20 percent by weight of powdered alumina in carbon tetrachloride. The spraying can be repeated, for example, 5 times, until each fuel particle is completely coated with the alumina. The slurry may also include 5 percent by weight of paraffin dissolved in the carbon tetrachloride so that as the slurry dries the individual particles of the alumina powder adhere together and also to the surface of the fuel particles.

After the coating operation is carried to completion and the ceramic fuel particles are each enclosed within a coating of the protective refractory material, the coated fuel particles are then compacted under suitable pressure to form a fuel body. Thus, for example, the fuel particles can be subjected to from 10,000 to 30,000 p.s.i. in a hardened steel die shaped to the desired form of the fuel body. The thus formed fuel body is then sintered, as previously described, to provide the finished ceramic fuel body.

Alternatively, if desired, the coated ceramic nuclear fuel particles can be mixed with or distributed around uncoated nuclear fuel particles in a manner which still provides in the assembled fuel body surfaces formed wholly of coated fuel particles. Thus, it should be understood that in the ceramic fuel bodies at least the surfaces thereof should be coated with the protective refractory material.

As previously indicated, if desired, the described coating operation can be carried out on already formed fuel compact, rather than on the individual fuel particles. Thus, the previously described ceramic nuclear fuel particles can be compacted at a suitable pressure, for example, 10,000 to 20,000 p.s.i. in a die to form a "green" fuel compact and then the surfaces thereof can be coated with the protective refractory material, that is, the refractory metal oxide, by any suitable coating operation. For example, the green fuel compact can be immersed in or sprayed with the described slurry of powdered metallic oxide in a neutral carrier or medium, with or without dissolved binder for the oxide.

It will be understood that, in the event fuel particles are utilized which comprise powdered fuel bound into aggregates by binder, any carrier or medium for the metal oxide or solvent for the metal oxide binder should not dissolve the particle binder. This is also true with respect to the previously described version of the second embodiment of the method of the present invention.

Thus, for example, uranium dioxide particles 300 microns in size can be compacted at 10,000 p.s.i. at ambient temperature in a steel die to a fuel compact and the fuel compact can then be immersed in a slurry comprising 30 percent by weight of beryllia powder in trichloroethylene containing 8 percent by weight of dissolved microcrystalline wax. The fuel body can be removed from the slurry, dried and then reinserted into the slurry, removed therefrom and dried, whereby a coating of beryllia completely encloses and seals off the fuel compact to form a fuel body. The fuel body is then sintered to provide a finished high temperature fuel body having the previously described thermally conductive, high temperature, fission product-resistant characteristics.

The following examples further illustrate various features of the second embodiment of the method of the present invention.

*Example II*

Uranium dioxide particles of approximately 60 mesh particle size are immersed in a slurry comprising 25 percent by weight of alumina in powdered form dispersed within dichlorobenzene containing about 3 percent by weight of polyvinyl acetate resin binder dissolved therein. The slurry is drained from the fuel particles which are then dried in a vacuum oven and recontacted by immersion in the slurry a second time. The recontacted particles are redrained, redried in the vacuum oven, and found to be uniformly coated with a tightly adhering layer of powdered alumina. The alumina is bonded to the surface of the uranium dioxide particles by the polyvinyl acetate. The coated uranium dioxide particles are then introduced into a steel die shaped in the form of a fuel body and are subjected therein to a pressure of 20,000 p.s.i. Thereafter, the resulting densified fuel body is removed from the die and sintered for 6 hours in an hydrogen atmosphere to provide a finished ceramic fuel body, comprising a fuel compact, the surfaces of which are completely coated with tightly adhering protective alumina. The fuel body exhibits high temperature stability, thermal conductivity and resistance to fision porduct migration.

*Example III*

Uranium dioxide particles are introduced into a steel die and compressed into a fuel compact at a pressure of 30,000 p.s.i. after which the compact is removed, sprayed with a slurry comprising 25 percent beryllia powder in carbon tetrachloride containing 5 percent microcrystalline wax dissolved therein. The spraynig operation is discontinued and the compact is dried in a vacuum oven.

The compact is resprayed 3 more times with the described slurry, being dried in the vacuum oven after each spraying, and then is sintered for a period of 8 hours under hydrogen to provide a finished ceramic fuel body comprising a dense uranium dioxide compact sheathed and entirely enclosed within a layer of beryllia bonded tightly thereto. The fuel body has essentially the same characteristics as the fuel bodies described in connection with Examples I and II.

Accordingly, improved ceramic nuclear fuel bodies are provided by the method of the present invention. Such fuel bodies have particular utility in neutronic reactors operating at very high temperatures, providing extended service therein without cracking. Little fission product migration occurs during use of the fuel bodies, due to the densified condition of the fuel bodies and the protective nature of the refractory metal oxide employed therein. Such refractory metal oxide cooperates with the ceramic nuclear fuel to provide a unitary product essentially ceramic in nature and having high thermal conductivity, uniform heat production and heat transfer characteristics and resistance to thermal shock especially desirable for high temperautre applications.

Other advantages of the present invention are as set forth in the foregoing. Various of the features of the present invention are set forth in the appended claims.

What is claimed is:

1. The method of making a high-temperature, heterogenous ceramic fuel body for use in a neutronic reactor which comprises pressing powdered ceramic nuclear fuel particles selected from the group consisting of the oxides, carbides, and silicides of nuclear fuel metal and mixtures thereof with a binder to form a green compact, coating said green compact with a slurry comprising a protective refractory material selected from the group consisting of alumina, beryllia, aluminum carbide, beryllium carbide and mixtures thereof and a liquid carrier for said refractory material, and thereafter sintering said coated compact to a dense, thermally conductive, high-temperature ceramic fuel body.

2. The method of claim 1 wherein said nuclear fuel particles comprise uranium dioxide and said refractory material is selected from the group consisting of alumina and beryllia.

3. The method of making a high-temperature heterogeneous ceramic fuel body for use in a neutronic reactor which comprises pressing powdered ceramic nuclear fuel particles selected from the group consisting of the oxides, carbides, and silicides of nuclear fuel metal and mixtures thereof with a binder to form a green compact, coating said green compact with a slurry comprising a protective refractory material selected from the group consisting of alumina, beryllia, aluminum carbide, beryllium, beryllium carbide and mixtures thereof and a liquid dispersing medium which is a non-solvent for said binder, and thereafter sintering said coated compact to a dense, thermally conductive, high-temperature ceramic fuel body.

4. The method of claim 3 wherein said nuclear fuel particles are uranium dioxide.

5. The method of claim 3 wherein said protective refractory material is selected from the group consisting of alumina and beryllia.

6. The method of claim 3 wherein said coating step comprises immersing said green compact in said slurry.

7. The method of claim 3 wherein said coating step comprises spraying said compact with said slurry.

8. The method of claim 3 wherein said binder is polyvinyl alcohol and said liquid medium is carbontetrachloride.

9. The method of claim 3 wherein said binder is paraffin and said liquid medium is water.

10. The method of claim 3 wherein a small percentage of a second binder soluble in said liquid medium is included in said slurry.

References Cited by the Examiner

UNITED STATES PATENTS

| 2,907,705 | 10/59 | Blainey | 176—91 |
| 3,031,389 | 4/62 | Goeddel et al. | 176—89 |
| 3,081,249 | 3/63 | Whittemore | 176—91 |
| 3,129,141 | 4/64 | Burnham | 176—90 |

OTHER REFERENCES

AEC Document, BMI–1321, Feb. 18, 1959, pp. 1–6.

CARL D. QUARFORTH, *Primary Examiner.*

L. DEWAYNE RUTLEDGE, REUBEN EPSTEIN,
*Examiners.*